(12) United States Patent
Shikii

(10) Patent No.: US 6,906,896 B2
(45) Date of Patent: Jun. 14, 2005

(54) LATCH MECHANISM FOR HARD DISK DRIVING DEVICE

(75) Inventor: Yoshio Shikii, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 256 days.

(21) Appl. No.: 10/276,045

(22) PCT Filed: Feb. 22, 2002

(86) PCT No.: PCT/JP02/01629

§ 371 (c)(1),
(2), (4) Date: Nov. 11, 2002

(87) PCT Pub. No.: WO02/067260

PCT Pub. Date: Aug. 29, 2002

(65) Prior Publication Data

US 2003/0107846 A1 Jun. 12, 2003

(30) Foreign Application Priority Data

Feb. 22, 2001 (JP) ........................................ 2001-046336

(51) Int. Cl.⁷ .............................................. G11B 21/22
(52) U.S. Cl. ..................................................... 360/256
(58) Field of Search ............................ 360/256, 256.4, 360/256.1, 126; 359/819

(56) References Cited

U.S. PATENT DOCUMENTS 4,905,111 A * 2/1990 Tuma et al. ................ 360/126
6,147,817 A * 11/2000 Hashizume .................. 359/819
6,507,461 B1 * 1/2003 Kimura et al. ........... 360/256.4
6,704,168 B1 * 3/2004 Michael et al. .......... 360/256.1

FOREIGN PATENT DOCUMENTS

| JP | 62-074099 | 4/1987 |
| JP | 2001-250344 | 9/2001 |
| WO | WO0074056 A1 * | 12/2000 |

* cited by examiner

Primary Examiner—Tianjie Chen
(74) Attorney, Agent, or Firm—Butzel Long

(57) ABSTRACT

A latch mechanism for a hard disk driving device with an enhanced reliability suitable for portable computer HDDs is provided by improving the latch mechanism as a stopper means for preventing unprepared movement of a magnetic head due to external forces such as vibrations or impacts, thereby preventing breakage of the head, caused by contact with a magnetic disk, and also coping with such external forces as very weak impacts or vibrations, where among structural members of the latch mechanism a longer link member having complicated shape is increased in weight to improve the response to the weak impacts and vibrations and make the specific gravity higher by adding 55 to 93% by weight of tungsten thereto as a metallic filler. The resulting decrease in the flowability during the injection molding due to the addition of tungsten as the metallic filler is covered by using 7 to 45% by weight of LCP (liquid crystal polymer) having a good flowability as a base material. Injection molding is carried out successfully with the resulting high specific gravity resin material of good flowability having a specific gravity as high as 3 to 10.

5 Claims, 2 Drawing Sheets

LATCH MECHANISM FOR HARD DISK DRIVING DEVICE

TECHNICAL FIELD

The present invention relates to a latch mechanism for protecting a magnetic head from any movement caused by weak impacts or vibrations and from the resulting breakage of a computer hard disk driving device (which will be hereinafter referred to as HDD), which can read/write information from/into a magnetic disk of recording medium by the magnetic head.

BACKGROUND ART

FIG. 1 and FIG. 2 are an overall plan view showing a general example of HDD, and an enlarged view of its essential portion, respectively. For example, three magnetic disks 3 as recording medium, laid coaxially one upon another at equal distances on spindle axis 2, can rotate in housing 1. A magnetic head (not shown in the drawings) for writing/reading information on/from magnetic disks 3 is fixed to the tip end of head arm 4. The base end of head arm 4 is pivotally supported on pivot axis 5 to make a rotary motion. Head arm 4 supports such parts as a suspension, a slider, a lifting feature, etc. The magnetic head fixed to the underside of the slider is kept on standby at a position away from magnetic disks 3, while retained by ramp structure 6, when HDD is out of operation (unloading time).

When HDD is put into operation (loading time), and when magnetic disks 3 reach a given revolution rate after starting to operate, head arm 4 makes a counterclockwise rotary motion shown by arrow mark X in FIG. 1 around pivot axis 5 to release the magnetic head from ramp structure 6, which has so far held the magnetic head, and to make the magnetic head move towards magnetic disks 3. The magnetic head is levitated to a height of a few $\mu$m from the surface of magnetic disks 3 and stayed there to conduct writing/reading of information.

In the case of the HDD loading in portable computers such as so-called lap-top personal computers or note-type personal computers it sometimes occurs that head arm 4 moves unpreparedly toward magnetic disks 3 particularly due to impacts or vibrations, especially during carrying, so that the magnetic head so far kept on standby may be released from ramp structure 6. As a result, it sometimes occurs that the magnetic head is brought into contact with the surface of magnetic disks 3 or stuck thereon to damage both of magnetic head and the magnetic disks, leading to erasing of recorded information.

To prevent such troubles, latch mechanism 10 as shown within circle C in FIG. 1, is provided as a stopper means to prevent unprepared movement of head arm 4 so as not to release the magnetic head from ramp structure 6 even if an external force due to impacts or vibrations acts on HDD.

As is apparent from the enlarged view shown in FIG. 2, latch structure 10 can release or control rotary motion of head arm 4 through abutment on locking pawls 4a and 4b provided on both sides of base edge of head arm 4. That is, latch structure 10 provides longer link member 11 capable of minute rotary motion such as a rocking motion in an counterclockwise direction A and in a clockwise direction B, while being pivotally supported by hinge pin 11a as a pivot shaft; first shorter link member 12 abutting on one projection 11b provided on the tip end portion of link member 11; second shorter link member 13 abutting on another projection 11c and leaf spring 14. Thus, all these members are released in case of HDD loading, thereby enabling counterclockwise rotary motion of head arm 4, whereas in case of HDD unloading all these members are engaged with locking pawls 4a and 4b of head arm 4, thereby inhibiting such a movement of head arm 4.

However, when HDD is subjected to relatively large external impact forces, such latch mechanism 10 can control the movement of head arm 4 correspond to the external force, but when the external impact force is very small, the response of longer link member 11 having a complicated shape in particular is not sharp among the structural members, because link member 11 has been so far made from resins and thus is light in weight. To increase the weight it would be possible to shift the materials of link member 11 from resins to metal, but production of such a longer link member having complicated shape as shown in FIGS. 1 and 2, by mechanical processing such as press molding, etc. is not so easy, because of very complicated fabrication of molds, etc. for such working, and also because of an increase in the resulting production cost as a problem.

DISCLOSURE OF THE INVENTION

An object of the present invention is to provide a highly reliable HDD latch mechanism particularly suitable for portable computers such as lap-top personal computers and notebook-type personal computers, whose magnetic heads have so far often suffered from breakage, etc., through contact with or sticking on a magnetic disk due to unprepared movement of the magnetic head by external forces such as vibrations or impacts during the carrying, because of the light weight. The present invention provides an improved latch mechanism capable of coping with a very small external force as a stopper means for preventing such an unprepared movement of the magnetic head.

To attain the object of the present invention, the present HDD latch mechanism is characterized in that structural members of the latch mechanism, particularly link members, are molded by a resin material comprising 7 to 45% by weight of a liquid crystal polymer having a good flowability as a base material and 93 to 55% by weight of tungsten as a metallic filler to make the resin material have a specific gravity of 3 to 10.

In the aforementioned structure of the present invention, the structural members of the latch mechanism, for example, longer link members having a complicated shape, are molded from a resin material having high specific gravity in place of the conventional resin having light weight, where the weight of resin material is increased by adding metallic tungsten thereto as a filler, while preventing the resulting decrease in flowability by using a liquid crystal polymer having a good flowability as a base material, thereby making the specific members of increased weight work as structural parts of latch mechanism to satisfy a good response even to very small external impact forces exerted when HDD is out of operation (unloading time) and preventing unprepared movement of the magnetic head toward the magnetic disks, thereby controlling contact with or sticking on the magnetic disk to prevent breakage, etc.

BEST MODES FOR CARRYING OUT THE INVENTION

Modes of embodiments of the present HDD latch mechanism will be described in detail below on the basis of FIG. 2, referring also to FIG. 1.

Figure 1:
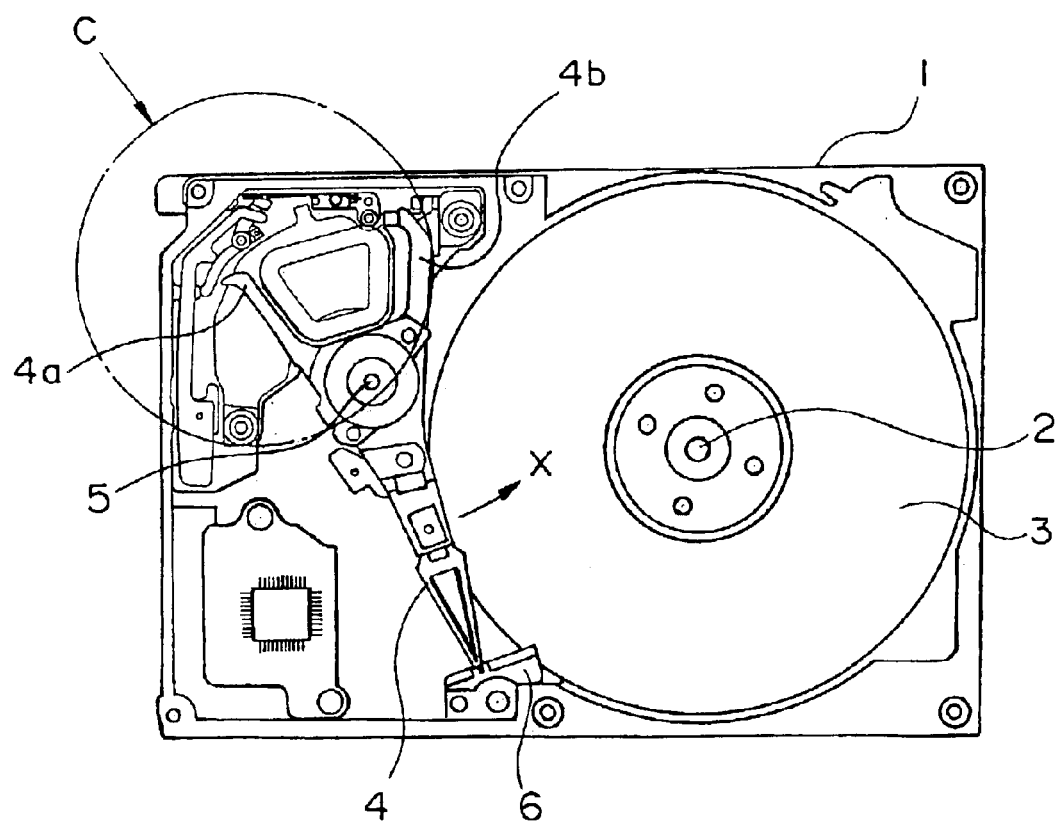
FIG. 1 is a plan view of HDD in general embodiment, provided with the present latch mechanism.
Figure 2:
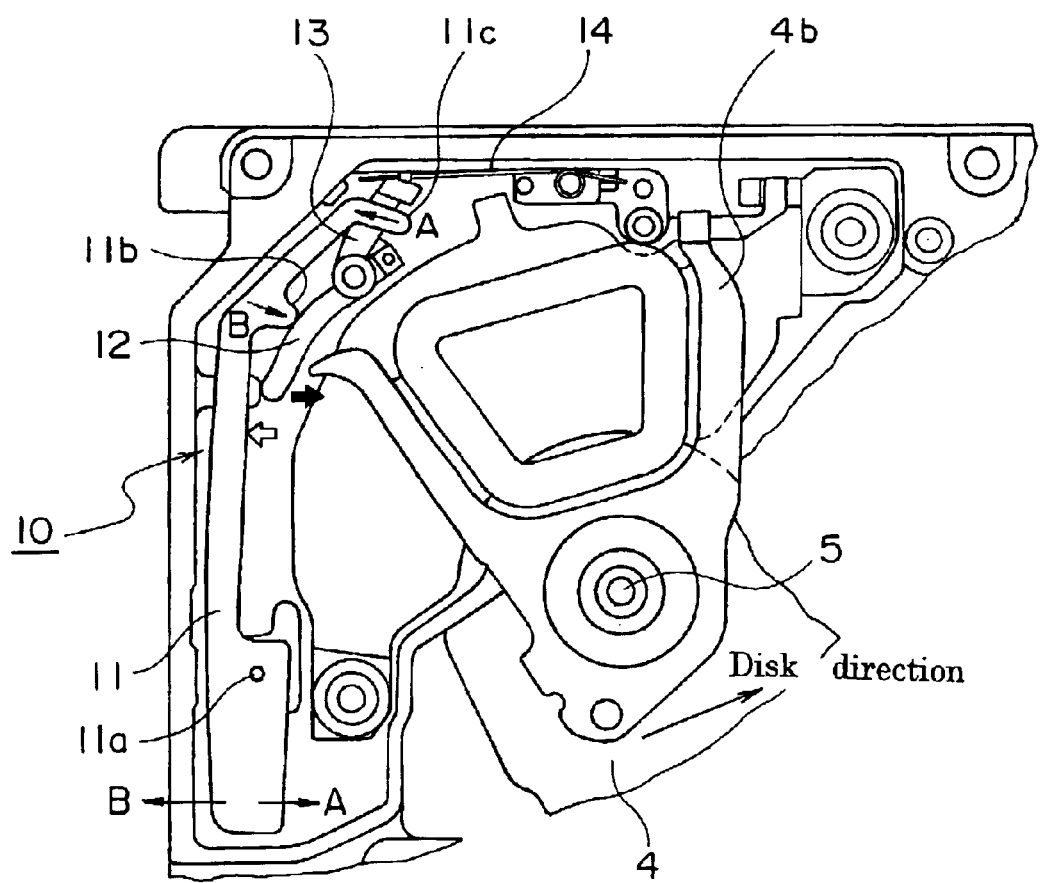
FIG. 2 is an enlarged plan view of the latch mechanism comprising improved link members.

Among links constituting latch mechanism 10 shown in FIG. 1, the present invention proposes to improve materials by weight increase to enhance the response of larger link member 11 having complicated shape, while ensuring production thereof by injection molding at the same time. The improvement is not limited only to link members 11, 12 and 13, but the present invention can be also applied to other structural members, if desired.

Weight of link member 11 can be increased by adding 55 to 93% by weight, preferably 78 to 91% by weight, of tungsten as a metallic filler to the base material, thereby making the resin material have a higher specific gravity. In the production of the link members by injection molding, the flowability of the resin material will be lowered by addition of the metallic tungsten to the resin material, but can be covered by using 45 to 7% by weight, preferably 22 to 9% by weight, of liquid crystal polymer (LCP) having a good flowability as a base material. The resulting resin material has a specific gravity as high as 3 to 10, preferably 5 to 9 and a good flowability, and thus can meet the injection molding requirements.

As the metallic tungsten, tungsten powder having particle sizes of 0.1 to 40 μm can be used, whereas any commercially available injection-moldable liquid crystal polymer can be used as the base material. When the mixing ratio of tungsten is below 55% by weight, the desired high specific gravity can not be obtained, whereas above 93% by weight the moldability will be deteriorated.

By loading latch mechanism 10 with link member 11 of increased weight as a structural member, link member 11 will make a rotary motion in the arrow direction B around pivot shaft 11a with a good response even to very small external impact forces exerted when HDD is out of operation (unloading time) and is engaged with locking pawl 4a of head arm 4 in collaboration with other link member 12, etc., thereby preventing unprepared counterclockwise rotary motion of head arm 4, that is, movement toward magnetic disk 3, thus preventing such troubles as breakage, etc. due to contact or sticking of the magnetic head loading at the tip end of head arm 4 with or onto the magnetic disk.

The following Table shows, in a comparative manner, physical properties of a link member of Example, obtained by injection molding of a high specific gravity resin material of LCP (Vectra A 950, a product made by Polyplastics) as a base material containing 89% by weight of tungsten (average particle size: 5 μm) as a metallic filler to make the resin material have a specific gravity of 8, unreinforced PC (polycarbonate) of Comparative Example 1, unreinforced LCP of Comparative Example 2 composed only of LCP and a resin material of LCP as a base material containing 30% by weight of PTFE (polytetrafluoroethylene) of Comparative Example 3.

|  | Example Tungsten-containing LCP | Comp. Ex. 1 Unreinforced PC | Comp. Ex. 2 Unreinforced LCP | Comp. Ex. 3 PTFE-containing LCP |
|---|---|---|---|---|
| Specific gravity | 8.0 | 1.20 | 1.40 | 1.54 |
| Tensile strength of normal portion (MPa) | 80 | 60 | 200 | 160 |
| Elongation of normal portion (%) | 5 | 100 | 5 | 5 |
| Tensile strength of welded portion (MPa) | 35 | 60 | 40 | — |
| Elongation of welded portion (%) | 0.5 | 30 | 0.5 | — |
| Rockwell hardness (R) | 110 | 125 | — | — |
| Bending strength (MPa) | 120 | 87 | 170 | 130 |
| Modulus in bending (GPa) | 10 | 2 | 10 | 9 |

As is apparent from the foregoing Table, the link member of Example could be injection molded from the high specific gravity resin material (specific gravity; 8) and was also evaluated, showing satisfactory mechanical properties. Though not shown in the foregoing Table, a link member of Comparative Example 4 made by injection molding of a high specific gravity resin material containing 6-nylon as a base material and tungsten as a metallic filler was low in brittleness as a mechanical property and was evaluated as an unsuitable structural member for the latch mechanism.

INDUSTRIAL APPLICABILITY

In the present latch mechanism for HDD, the structural members of the latch mechanism, for example, a longer link member having complicated shape, can be molded from a high specific gravity resin material in place of the conventional light weight resin, where the weight is increased by adding metallic tungsten thereto as a filler, while preventing the resulting decrease in flowability by using LCD (liquid crystal polymer) having a good flowability as a base material, thereby making the specific members work as structural parts of latch mechanism to satisfy a good response even to very small external impact forces exerted when HDD is out of operation (unloading time) and preventing unprepared movement of the magnetic head toward the magnetic disks to prevent breakage, etc. due to contact or sticking thereof with or on the magnetic disks and to effectively enhance reliability of the latch mechanism. Furthermore, the latch mechanism members are also distinguished in low outgas-sealability and stable dimensional precision.

What is claimed is:

1. A latch mechanism for a hard disk driving device capable of controlling movement of a magnetic head toward a magnetic disk due to external impact forces, charazterized in that structural members for the latch mechanism are molded from a resin material comprising a liquid crystal polymer having a good flowability as a base material and metallic filler to make the resin material have a specific gravity of 3 to 10.

2. A latch mechanism for a hard disk driving device according to claim 1, wherein the resin material comprises 7 to 45% by weight of the liquid crystal polymer as a base material and 93 to 55% by weight of tungsten as the metal filler.

3. A latch mechanism for a hard disk driving device according to claim 2, wherein powdery tungsten having particle sizes of 0.1 to 40 $\mu$m is used as the tungsten.

4. A latch mechanism for a hard disk driving device according to claim 1, wherein the structural members are link members.

5. A latch mechanism for a hard disk driving device according to claim 4, wherein the link members are injection-molded articles.

* * * * *